(12) United States Patent
McIntosh

(10) Patent No.: US 8,620,734 B2
(45) Date of Patent: Dec. 31, 2013

(54) METHODS, DEVICES AND COMPUTER PROGRAM PRODUCTS FOR CUSTOMER OPERATED COUPON TRACKING

(75) Inventor: Robert S. McIntosh, Loganville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1250 days.

(21) Appl. No.: 11/425,532

(22) Filed: Jun. 21, 2006

(65) Prior Publication Data
US 2008/0010121 A1 Jan. 10, 2008

(51) Int. Cl.
*G06Q 30/00* (2012.01)
*H04N 7/16* (2011.01)

(52) U.S. Cl.
USPC .............. 705/14.1; 705/14.23; 705/14.28; 725/26; 725/27

(58) Field of Classification Search
USPC ............... 705/14, 1–50, 14.1, 14.23, 14.28; 707/1–10; 235/374–375; 725/26, 27
See application file for complete search history.

(56) References Cited

U.S. PATENT DOCUMENTS

| 5,192,854 | A  | * | 3/1993 | Counts ........................... 235/375 |
| 6,587,835 | B1 | * | 7/2003 | Treyz et al. ..................... 705/14 |
| 6,739,514 | B2 |   | 5/2004 | Sanders et al. |
| 7,343,317 | B2 |   | 3/2008 | Jokinen |
| 2003/0024981 | A1 | * | 2/2003 | Narasimhan .................. 235/383 |

OTHER PUBLICATIONS

Haartsen "Bluetooth-The universal radio interface for *ad hoc*, wireless connectivity" *Ericsson Review* 3:110-117 (1998).

* cited by examiner

*Primary Examiner* — Sun Li
(74) *Attorney, Agent, or Firm* — Woodcock Washburn LLP

(57) ABSTRACT

A method of providing coupons for shopping includes storing a shopping list in an electronic device including items for purchase via a merchant, storing electronic representations of coupons in the electronic device and associating the electronic representations of coupons with items included in the shopping list.

20 Claims, 4 Drawing Sheets

METHODS, DEVICES AND COMPUTER PROGRAM PRODUCTS FOR CUSTOMER OPERATED COUPON TRACKING

FIELD OF THE INVENTION

The present invention generally relates to the field of electronic communications.

BACKGROUND

It is known to provide coupons to encourage customers to shop at particular merchants and/or purchase particular products. For example, it is known that a manufacturer may place a coupon in a newspaper which is distributed to potential customers. The customer "cuts out" the coupon, sorts it and stores it with other coupons. Once in the store, the customer searches for the coupon in a stack of coupons of varying size and then searches for the product covered by the coupon. At the checkout stand the clerk examines the coupon's expiration date, verifies that the correct product was purchased, and subtracts the coupon's value from the purchase price. The clerk at some point in time performs a preliminary sort of the coupons by manufacturer and tallies them. The coupons are next sent to a clearing house that sorts and tallies all of the coupons for a store and sends them to the manufacturer for redemption. The manufacturer once again sorts and tallies the coupons before performing reimbursement.

The distribution and processing of coupons is also discussed in, for example, U.S. Pat. No. 5,192,854 and U.S. Pat. No. 6,739,514.

SUMMARY

Embodiments according to the invention can provide methods, devices, and computer program products for customer operated coupon tracking. Pursuant to these embodiments, a method of providing coupons for shopping includes storing a shopping list in an electronic device including items for purchase via a merchant, storing electronic representations of coupons in the electronic device and associating the electronic representations of coupons with items included in the shopping list.

In some embodiments according to the invention, associating the electronic representations of coupons with items further includes determining categories for the items included in the shopping list, determining if any of the electronic representations of coupons are associated with any of the categories, and associating ones of the electronic representations of coupons determined to be associated with a category. In some embodiments according to the invention, the method further includes wirelessly detecting presence of the electronic device at a location of the merchant and wirelessly accessing the shopping list and/or the electronic representations of coupons in the electronic device.

In some embodiments according to the invention, the method further includes wirelessly transmitting information about a selected item to the electronic device, wherein the selected item is selected based on an item included in the shopping list, an electronic representation of a coupon, information from a product provider to the merchant, and/or a promotion by the merchant.

In some embodiments according to the invention, wirelessly transmitting includes wirelessly transmitting the information to the electronic device for display thereon prior to products being scanned into the electronic device at the merchant location. In some embodiments according to the invention, the method further includes maintaining display of the selected item on the electronic device as the electronic device moves within the location and highlighting display of the selected item in response to detected proximity of the electronic device to a position within the merchant location that is associated with the selected item.

In some embodiments according to the invention, the method further includes receiving a code identifying a scanned product at the electronic device, determining whether any of the electronic representations of coupons are applicable to the code identifying the scanned product, associating the code identifying the scanned product responsive to determining that at least one electronic representation of the coupons is applicable to the code identifying the scanned product, and requesting confirmation of the scanned product responsive to determining that none of the electronic representations of the coupons is applicable to the code identifying the scanned product and that at least one electronic representation of the coupons stored in the electronic device is applicable to another product in the same category as the scanned product.

In some embodiments according to the invention, requesting confirmation of the scanned product includes displaying a message that no coupon is applicable to the scanned product and/or displaying an alternative product for which a coupon is applicable and requesting input to accept the scanned product or reject the scanned product. In some embodiments according to the invention, the method further includes transferring at least one code identifying the scanned product to a merchant system, verifying authenticity of the at least one electronic representation of the coupons applicable to the code identifying the scanned product, adjusting a total price to be paid to the merchant based on the at least one code identifying the scanned product, and invalidating the at least one electronic representation of the coupons applicable to the code identifying the scanned product stored in the electronic device.

In some embodiments according to the invention, a method of providing coupons for shopping includes wirelessly detecting presence of an electronic device, at a location of a merchant, the electronic device having a shopping list and an electronic representation of a coupon associated with an item on the shopping list stored therein and wirelessly accessing the shopping list and/or the electronic representations of coupons in the electronic device.

In some embodiments according to the invention, an electronic device configured to track coupons for shopping includes a wireless interface circuit configured to wirelessly transmit/receive data, a memory circuit configured to store a shopping list including items for purchase via a merchant and to store electronic representations of coupons, a check-out interface circuit configured to transfer electronic representations of coupons associated with scanned products stored in the memory circuit from the electronic device, a processor circuit, coupled to the memory circuit, to the wireless interface circuit, and to the check-out interface circuit, the processor circuit configured to provide the electronic representations stored in the memory circuit, and configured to associate the electronic representations of coupons with items included in the shopping list, and configured to communicate with a merchant system via the wireless interface circuit; and configured to transmit electronic the representations of coupons associated with scanned products stored in the memory circuit via the check-out interface circuit.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

DESCRIPTION OF THE EMBODIMENTS ACCORDING TO THE INVENTION

Figure 1:
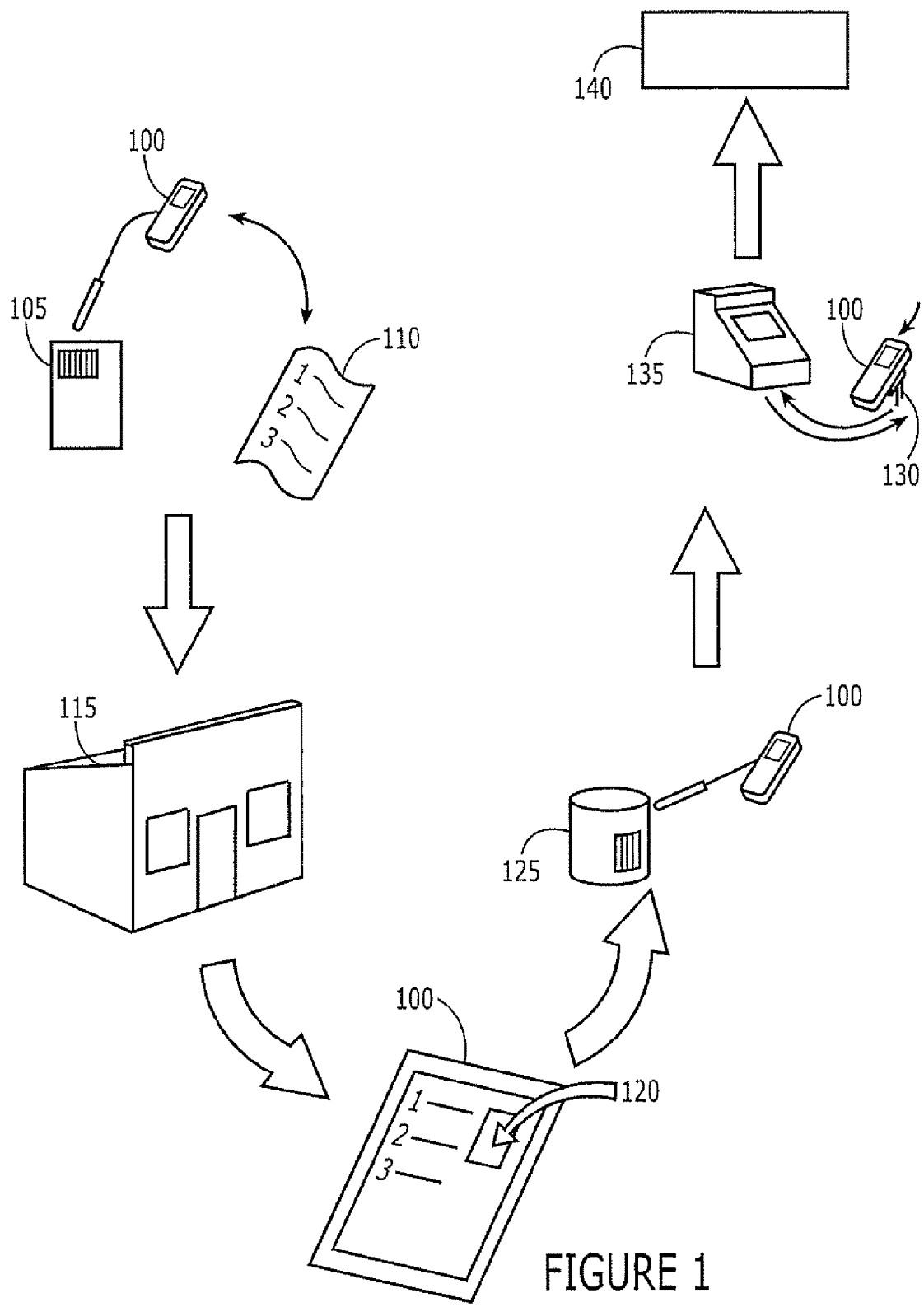
FIG. 1 is a flow diagram that illustrates the distribution and processing of coupons in some embodiments according to the invention.

The present invention now is described more fully hereinafter with reference to the accompanying figures, in which embodiments of the invention are shown. This invention may, however, be embodied in many alternate forms and should not be construed as limited to the embodiments set forth herein. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

It will be understood that, when an element is referred to as being "coupled" to another element, it can be directly coupled to the other element or intervening elements may be present. In contrast, when an element is referred to as being "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense expressly so defined herein.

The present invention is described below with reference to diagrams (such as schematic illustrations) and/or operational illustrations of methods, devices, and computer program products according to embodiments of the invention. It is to be understood that the functions/acts noted in the figures may occur out of the order noted in the operational illustrations. For example, two elements shown in succession may in fact be executed substantially concurrently or the elements may sometimes be executed in the reverse order, depending upon the functionality/acts involved.

The present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

Computer program code or "code" for carrying out operations according to the present invention may be written in an object oriented programming language such as JAVA®, Smalltalk or C++, JavaScript, Visual Basic, TSQL, Pert, or in various other programming languages. Software embodiments of the present invention do not depend on implementation with a particular programming language. Portions of the code may execute entirely on one or more systems utilized by an intermediary server.

The computer program code may be provided to a processor of a general purpose computer, special purpose computer, or other programmable data processing apparatus as instructions to produce a machine, such that the instructions, which execute via the processor of the computer or other programmable data processing apparatus, create means for implementing the functions specified in the illustrations.

The computer code may be stored in a computer-readable memory that can direct a computer or other programmable data processing apparatus to function in a particular manner, such that the instructions stored in the computer-readable memory produce an article of manufacture including instruction means which implement the function specified in the illustrations.

As described hereinbelow in greater detail, in some embodiments according to the invention, a shopping list including items for purchase at a merchant location can be stored in an electronic device along with electronic representations of coupons that are scanned by the electronic device. The electronic device can associate the electronic representations of the coupons with items included in the shopping list. For example, the shopping list may specify a particular brand of product to be purchased at the merchant location, which can be associated with an electronic representation of a coupon for the purchase of that product.

In still further embodiments according to the invention, an item on the shopping list may be named only generically so that a particular brand is not identified. Accordingly, the electronic device can determine categories for items included in the shopping list so that those items may be more easily associated with coupons for particular brands of products. For example, an item on the shopping list may simply be listed as "bread". The electronic device can determine a category into which the item "bread" is mapped. Similarly, coupons for particular brands of products can also be mapped into categories so that generic listed items included in the shopping list may be more easily associated with possible applicable coupons.

In other embodiments according to the invention, a system at a merchant location may wirelessly detect the presence of the electronic device. Once detected, the system can wirelessly access the shopping list and/or the coupons stored in the electronic device whereupon the system may wirelessly transmit information about selected items to the electronic device. The information about the selected items can be selected based on, for example, items on the shopping list, coupons stored in the electronic device, information from a product provider, and/or a promotion by the merchant. Accordingly, the system may determine (for example based on the shopping list and/or the scanned coupons stored in the electronic device), which products the customer may be interested in purchasing. In response, the system can then transmit information, such as advertisements or additional coupons, to the electronic device to encourage the customer to make certain purchases.

In some embodiments according to the invention, information wirelessly transmitted to the electronic device by the system may be maintained persistently on a display of the electronic device during the customer's visit to the merchant location. Furthermore, the information may change or be highlighted as the customer moves about the merchant location and, more particularly, may become more prominent when the customer is in the proximity of the advertised products.

In still other embodiments according to the invention, the customer can scan products when shopping whereupon the electronic device attempts to associate the scanned product with stored coupons. In some embodiments according to the invention, the electronic device may ask for confirmation from the customer as to whether a particular product is to be purchased when, for example, the electronic device determines that a coupon exists for a product other than the scanned product. For example, if a coupon for a particular brand of soup is stored in the electronic device, and a customer scans a different soup product, the electronic device may request that the customer confirm the purchase of the scanned product.

Figure 2:
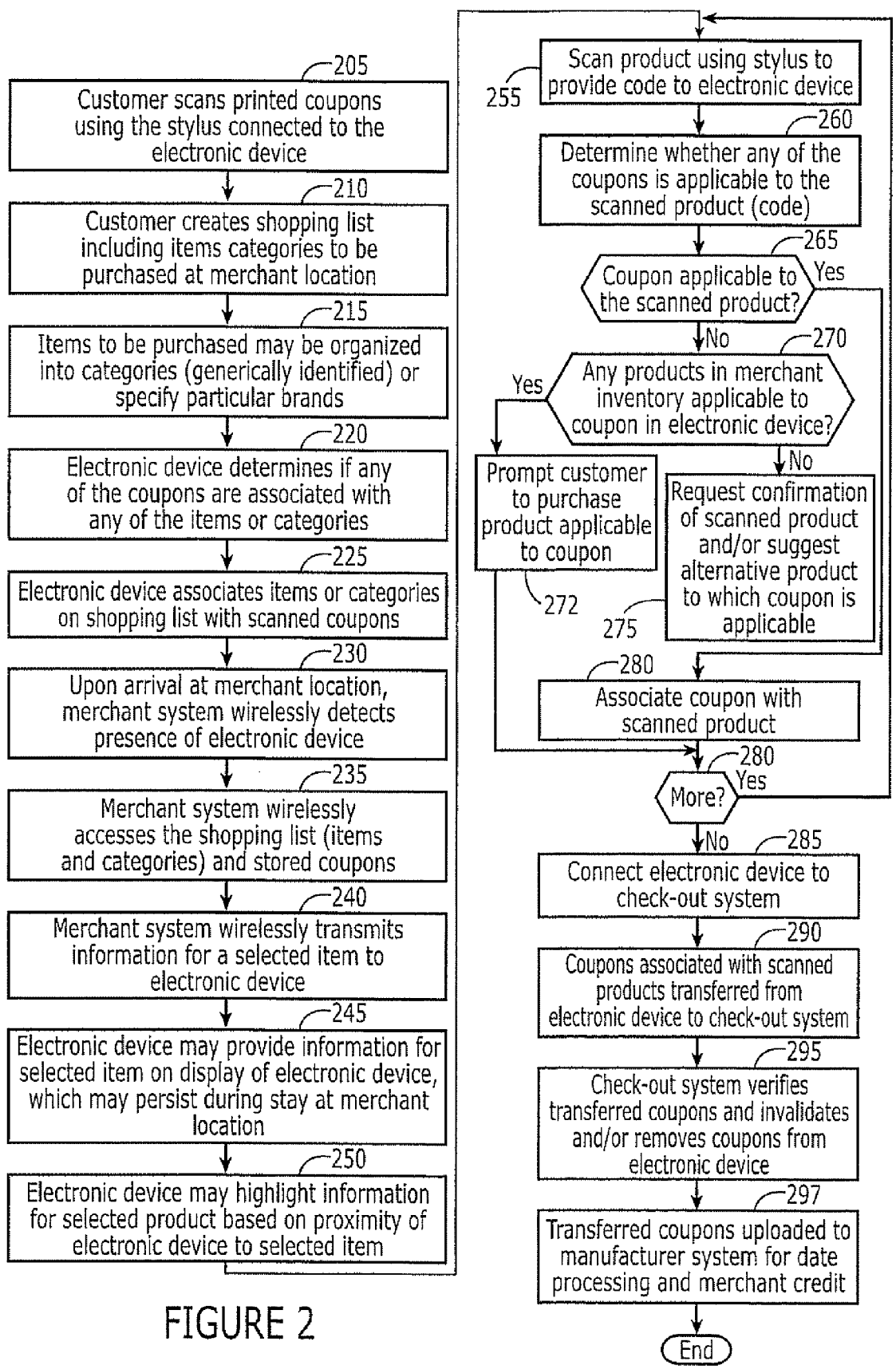
FIG. 2 is a flowchart that illustrates the distribution and processing of coupons in conjunction with the flow diagram shown in FIG. 1 in some embodiments according to the invention.
Figure 3:
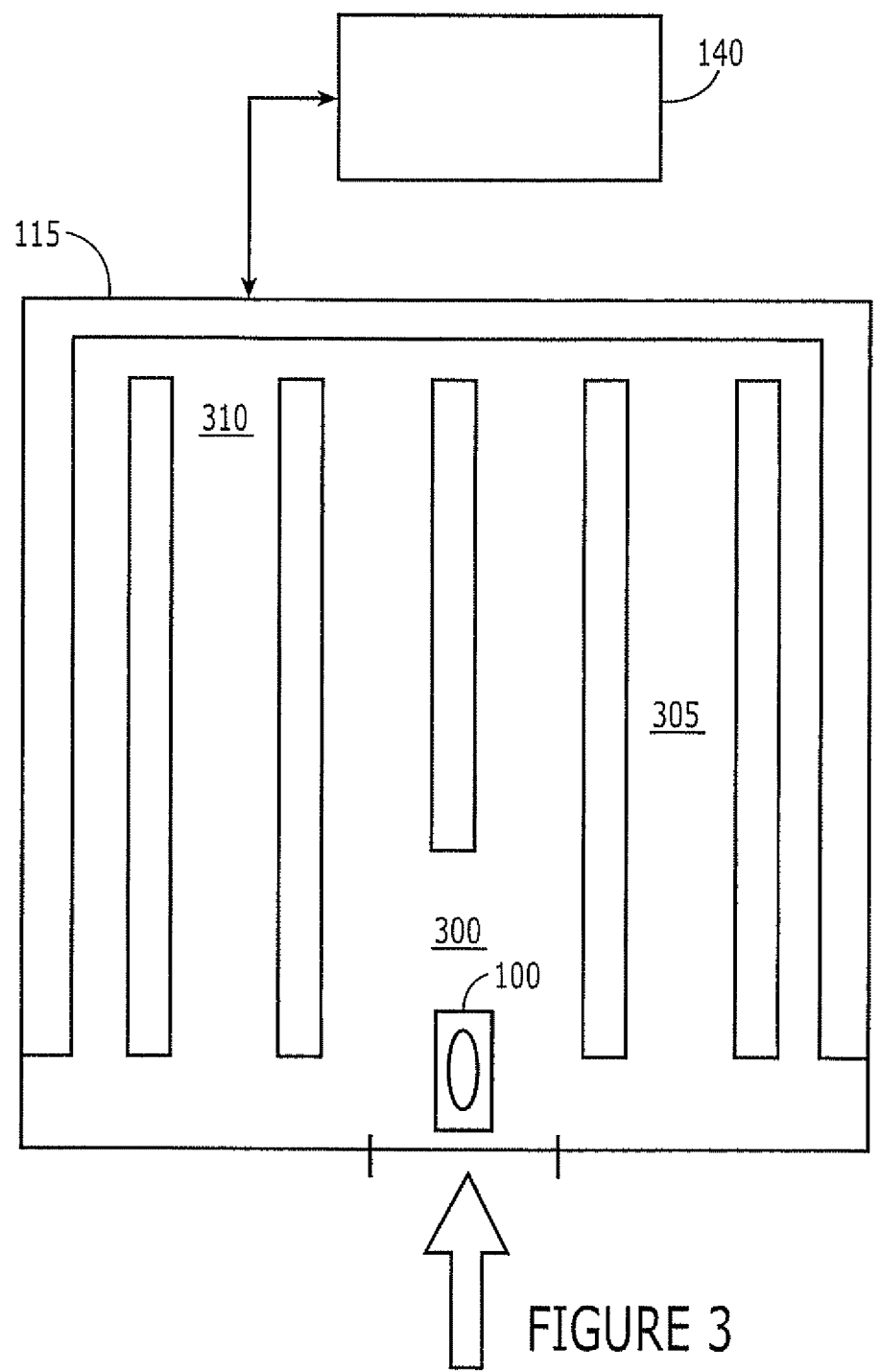
FIG. 3 is a schematic illustration of a merchant location having a merchant system that communicates with electronic devices while at the merchant location according to some embodiments of the invention.

FIG. 1 is a flow diagram that schematically illustrates the processing of coupons by a customer according to some embodiments of the invention. FIG. 2 is a flowchart that also illustrates the processing of coupons by a customer during a visit to a merchant location. FIG. 3 is a schematic representation of a merchant location coupled to a merchant system according to some embodiments of the invention. As described hereinbelow in greater detail, FIGS. 1-3 are referenced jointly to describe the processing of coupons by customers according to embodiments of the present invention.

According to FIG. 1, a merchant distributes printed material including coupons 105, such as in a newspaper or other periodical including an advertising supplement. A customer scans the coupons 105 using a stylus 101 connected to an electronic device 100. It will be understood that the coupons 105 can be formatted according to standard U.P.C. coupon codes, UCC/EAN128 coupon extended codes, or other standard codes such as those promulgated by the FMUCMA Coupon Scanning Subcommittee of the Joint Coupon Committee.

Figure 4:
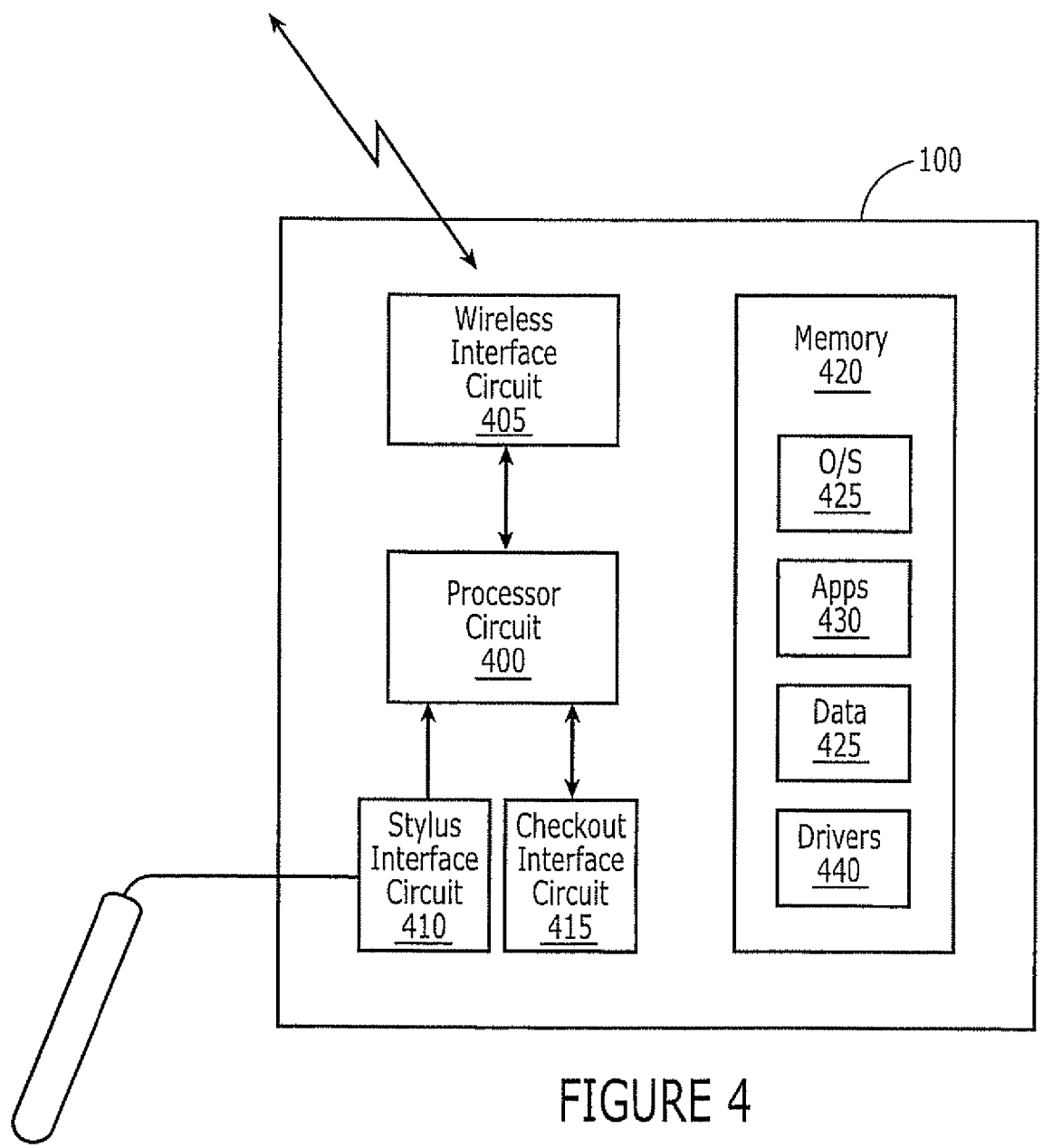
FIG. 4 is a block diagram illustrating electronic devices in some embodiments of the invention.

The stylus 101 can be any device that is capable of scanning optical bar codes such as those commonly used in printed coupons. The stylus 101 is passed over the coupons 105 to provide an electronic representation of the coupons 105 to the electronic device 100 (Block 205). The electronic device 100 stores the electronic representations of the coupons 105 in a memory therein. It will be understood that the stylus 101 and the electronic device 100 may be separate devices (as shown in FIG. 4) or may be integrated into a single device. As used herein the term "coupon" is sometimes used to refer to electronic representations of scanned coupons that are stored in the electronic device 100.

It will be understood that the electronic device 100 can be a personal digital assistant (i.e., PDA) or other handheld device that a customer could conveniently carry to a merchant location for use while shopping. Other types of devices include a cellular telephone; a Personal Communications System (PCS) terminal that may combine a cellular telephone with data processing, facsimile and data communications capabilities; a conventional laptop; or a palmtop computer.

The customer provides a shopping list 110 including items to be purchased during a visit to a merchant location (see block 210). The shopping list 110 can include generically listed items (such as "bread" or "milk") or particular brands of products to be purchased (such as "Brand A Soup"). Furthermore, the shopping list 110 can be entered into the electronic device 100 by the customer manually or may be created using software that produces a hard copy output including U.P.C. codes similar to those used to provide the coupons 105 corresponding to the items to be purchased. Accordingly, the shopping list 10 may be scanned using the stylus 101 in much the same way that the coupons 105 are scanned.

In some embodiments according to the invention, the electronic device 100 associates items included in the shopping list with electronic representations of the coupons 105 in the electronic device 100. For example, an item on the shopping list may specify a particular brand of soup for purchase which is associated with a coupon for the same brand of soup scanned by the customer. In still further embodiments according to the invention, the shopping list 110 may include items using a generic description (such as "bread" or "milk"). Accordingly, the electronic device 100 can determine a category for such generically listed items. Similarly, the electronic device 100 may determine categories for scanned coupons 105 and can then associate the coupons with the generically listed items in the same category (Blocks 215-225).

The customer travels to a merchant location 115 whereupon the presence of the electronic device 100 is detected by a merchant system (Block 230). As shown in FIG. 3, the electronic device 100 is detected by a merchant system 140 upon arriving at the merchant location 115. It will be understood that although the electronic device 100 is shown inside the merchant location 115 in FIG. 3, the presence of the electronic device 100 may be detected outside the merchant location 115 but proximate thereto (such as in the parking lot).

Once the electronic device 100 is detected at the merchant location 115, the merchant system 140 can wirelessly access the shopping list and/or the electronic representations of the coupons stored in the electronic device 100 (Block 235). The system 140 can thereby determine which products the customer is interested in purchasing during the visit.

In some embodiments according to the invention, the electronic device 100 notifies the customer that the merchant system 140 is attempting to access the shopping list and/or the electronic representations of the coupons, whereupon the customer may be prompted whether to allow the access. In some embodiments according to the invention, the customer can enter a security code to allow access by the merchant system 140. In still other embodiments according to the invention, the customer may otherwise indicate that access is denied.

Furthermore, the merchant system 140 may wirelessly transmit information about selected items to the electronic device (Block 240). It will be understood that the information wirelessly transmitted to the electronic device 100 by the merchant system 140 can be selected based on the items included in the shopping list and/or the coupons stored therein. For example, the merchant system may examine the shopping list and determine what other products the customer may be interested in purchasing. For example, the merchant system 140 may access the shopping list and transmit a new coupon for a product included on the shopping list or for a product that maps to a category included in the shopping list.

Alternatively, the merchant system 140 may transmit advertising information to the electronic device 100 for display thereon. It will be understood that in some embodiments according to the invention, the information transmitted by the merchant system 140 to the electronic device 100 may be persistently displayed thereon while the customer is at the merchant location (Block 245).

Alternatively, the information provided by the merchant system 140 to the electronic device 100 may be highlighted or otherwise emphasized responsive to the customer's location (i.e., the electronic device's location) at the customer location 115 (Block 250). In particular, referring to FIG. 3, the information transmitted by the merchant system 140 may be emphasized as the electronic device 100 nears a location 305 at the merchant location 115. For example, information 120 may "pop-up" on the display of the electronic device 105 as the customer approaches the location 305. In still other embodiments according to the invention, the electronic device 100 may issue an audible alarm as the customer approaches location 305. In some embodiments according to the invention, the electronic device 100 can issue the visual and/or the audible indications described above.

Referring again to FIGS. 1 and 2, the customer scans a product 125 using the electronic device 100 to provide an electronic representation of the U.P.C. code located on the product 125 to the electronic device 100 for storage therein (Block 255). The electronic device 100 then determines whether any of the coupons stored in the electronic device 100 are applicable to the scanned product 125 (Block 260).

If a coupon is applicable to the scanned product 125 (Block 265), the coupon stored in the electronic device 100 is associated with the scanned product 125 (Block 280). If, however, no stored coupon is applicable to the scanned product 125 (Block 265), the electronic device 100 may determine whether any product in the merchant inventory is applicable to any coupon stored in the electronic device 100 that is in the same category as the scanned product 125 (Block 270). If there is a product in the merchant inventory that is applicable to a coupon stored in the electronic device 100, the electronic device 100 may prompt the customer to purchase the product that is applicable to the stored coupon (Block 272) and waits for another product to be scanned. If, however, there is no product in the merchant inventory that is applicable to a coupon in the same category in which the scanned product 125 resides (Block 270), the electronic device 100 may request confirmation that the scanned product 125 is to be purchased (Block 275).

The customer continues to scan products until the shopping list is fulfilled (Block 282) whereupon the customer or clerk at the merchant location 115 connects the electronic device 100 to an interface 130 that is coupled to a check out system 135 (Block 285). The check out system 135 accesses the electronic device 100 and transfers the coupons associated with scanned products from the electronic device 100 (Block 290). The check out system 135 verifies that the transferred coupons are valid by, for example, communicating with the merchant system 140 which may include a database of valid coupons. Upon validation, the check out system 135 then removes (or otherwise invalidates) the coupons associated with the scanned products stored in the electronic device 100 (Block 295). The validated coupons transferred from the electronic device 100 to the check out system 135 can then be uploaded to a manufacturer system (not shown) for data processing and to provide credit to the merchant (Block 197).

Referring again to FIG. 3, when the customer scans a particular product, the merchant system 140 may provide information related to other items (such as items not included on the shopping list), that the customer may be interested in purchasing during the visit. For example, the merchant system 140 may determine that a relationship exists between a scanned product and another product offered by the merchant (such as "cookies" and "milk"). Accordingly, when the customer scans "chocolate cookies," the merchant system 140 may wirelessly transmit information related to "milk" (such as the location of milk at the merchant location 115).

It will be understood that the merchant system 140 may wirelessly provide information to the electronic device 100 based on, for example, the location of the customer at the merchant location 115. For example, the merchant system 140 may determine that the customer is presently at position 30 at the merchant location 115 based on a product scanned by the customer. The merchant system 140 may prompt the user with information related to products that are located near position 310.

FIG. 4 is a block diagram that illustrates electronic devices 100 according to some embodiments of the invention. As shown in FIG. 4, a processor circuit 400 is coupled to each of the other subsystems shown and thereby coordinates the operations thereof. The processor circuit 400 is coupled to a stylus interface circuit 410 that is configured to receive the electronic representations of coupons scanned by the stylus. The processor circuit 400 is also coupled to a wireless interface circuit 405 that is configured to transmit/receive information to/from the merchant system 140, such as information for display, the shopping list stored in the electronic device, as well as the electronic representations of the coupons stored in the electronic device 100. The wireless interface circuit 405 can also be used to receive information indicating a location of the electronic device 100 within the merchant location 115.

The wireless interface circuit 405 can be an IEEE 802.11 compliant interface included in the communication device 100. In other embodiments according to the invention, the wireless interface circuit 405 can provide connectivity to an "ad hoc" network, such as a Bluetooth compliant network. As used herein, an "ad hoc" protocol network or transmitter refers to one that is generally configured at the time of use based on the resources available. Such networks, typically, provide a service discovery protocol to allow, for example, identification of available resources. They may also negotiate various aspects of operations, such as peer relationships between resources, at the time of use of the resources. The Bluetooth™ interface is further described in an article authored by Jaap Haartsen entitled *Bluetooth—The universal radio interface for ad hoc, wireless connectivity*, Ericsson Review, No. 3, 1998, which is hereby incorporated herein by reference in its entirety.

The processor circuit 400 is also coupled to a check out interface circuit 415 that is configured to transmit/receive information to/from the check out system 135, such as coupons associated with the scanned products. The processor circuit 400 can be any commercially available or custom microprocessor, microcontroller, digital signal processor or the like.

The memory circuit 420 may include any memory devices containing the software and data used to implement the functionality circuits or modules used in accordance with embodiments of the present invention. The memory circuit 420 can include, but is not limited to, the following types of devices: ROM, PROM, EPROM, EEPROM, flash memory, SRAM, DRAM and magnetic disk.

As further illustrated in FIG. 4, the memory circuit 420 may include several categories of software: an operating system 425; application programs 430 including the software to provide the operations of the electronic device 100 described herein; and data 435. The data 435 represents the static and dynamic data used by the application programs 430, the operating system 425, and the device drivers 440 for the various interface circuits described herein, that may reside in the memory 420.

As will be appreciated by those of skill in the art, the operating system 425 may be any operating system suitable for use with the electronic device 100, such as OS/2, AIX or zOS from International Business Machines Corporation, Armonk, N.Y., Windows 95, Windows98, Windows2000 or WindowsXP from Microsoft Corporation, Redmond, Wash., Unix or Linux. The device drivers 440 typically include software routines accessed through the operating system 425 by the application programs 430 to communicate with devices such as the check-out interface circuit 415 and the stylus interface circuit 410.

As described hereinbelow in greater detail, in some embodiments according to the invention, a shopping list including items for purchase at a merchant location can be stored in an electronic device along with electronic representations of coupons that are scanned by the electronic device. The electronic device can associate the electronic representations of the coupons with items included in the shopping list. For example, the shopping list may specify a particular brand of product to be purchased at the merchant location, which can be associated with an electronic representation of a coupon for the purchase of that product.

In still further embodiments according to the invention, an item on the shopping list may be named only generically so that a particular brand is not identified. Accordingly, the electronic device can determine categories for items included in the shopping list so that those items may be more easily associated with coupons for particular brands of products. For example, an item on the shopping list may simply be listed as "bread". The electronic device can determine a category into which the item "bread" is mapped. Similarly, coupons for particular brands of products can also be mapped into categories so that generic listed items included in the shopping list may be more easily associated with possible applicable coupons.

In other embodiments according to the invention, a system at a merchant location may wirelessly detect the presence of the electronic device. Once detected, the system can wirelessly access the shopping list and/or the coupons stored in the electronic device whereupon the system may wirelessly transmit information about selected items to the electronic device. The information about the selected items can be selected based on, for example, items on the shopping list, coupons stored in the electronic device, information from a product provider, and/or a promotion by the merchant. Accordingly, the system may determine (for example based on the shopping list and/or the scanned coupons stored in the electronic device), which products the customer may be interested in purchasing. In response, the system can then transmit information, such as advertisements or additional coupons, to the electronic device to encourage the customer to make certain purchases.

In some embodiments according to the invention, information wirelessly transmitted to the electronic device by the system may be maintained persistently on a display of the electronic device during the customer's visit to the merchant location. Furthermore, the information may change or be highlighted as the customer moves about the merchant location and, more particularly, may become more prominent when the customer is in the proximity of the advertised products.

In still other embodiments according to the invention, the customer can scan products when shopping whereupon the electronic device attempts to associate the scanned product with stored coupons. In some embodiments according to the invention, the electronic device may ask for confirmation from the customer as to whether a particular product is to be purchased when, for example, the electronic device determines that a coupon exists for a product other than the scanned product. For example, if a coupon for a particular brand of soup is stored in the electronic device, and a customer scans a different soup product, the electronic device may request that the customer confirm the purchase of the scanned product.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method comprising:
   storing a representation of a coupon in an electronic device;
   storing a shopping list of items in the electronic device; and
   selecting, by a processor, based, at least in part, on a match between the stored representation of the coupon and an item of the list of items, the item from the list of items;
   determining that the electronic device is within a proximity to the selected item;
   altering the display, on the electronic device, of the selected item-as proximity of the electronic device to a location of the selected item changes; and
   maintaining the altered display of the indication of the selected item on the electronic device as the electronic device moves within a merchant location.

2. The method of claim 1 further comprising:
   determining categories for the items included in the shopping list;
   determining if the coupon is associated with any of the categories; and
   associating the coupon determined to be associated with a category.

3. The method of claim 1 wherein the stored representation of the coupon in the electronic device is wirelessly accessed upon wireless detection of the electronic device proximate a location of a merchant.

4. The method of claim 1, further comprising receiving, by the electronic device, information about the selected item.

5. The method of claim 4, further comprising displaying the information on the electronic device prior to products being scanned into the electronic device at a merchant location.

6. The method of claim 1, wherein altering the display comprises:
   highlighting the display of the indication of the selected item.

7. The method of claim 1 further comprising:
receiving, by the electronic device, a code identifying a scanned product;
determining whether the coupon is applicable to the code identifying the scanned product;
associating the code identifying the scanned product responsive to determining that the coupon is applicable to the code identifying the scanned product; and
requesting confirmation of the scanned product responsive to determining that the coupon is applicable to the code identifying the scanned product and that the coupon is applicable to another product in the same category as the scanned product.

8. The method of claim 7 wherein requesting confirmation of the scanned product comprises:
displaying a message that no coupon is applicable to the scanned product and requesting an indication to one of accept the scanned product or reject the scanned product.

9. The method of claim 7 further comprising:
transferring at least one code identifying the scanned product to a merchant system;
verifying authenticity of the coupon applicable to the code identifying the scanned product;
adjusting a total price to be paid to the merchant based on the at least one code identifying the scanned product; and
invalidating the at least one electronic representation of the coupons applicable to the code identifying the scanned product stored in the electronic device.

10. A device comprising:
a processor; and
memory coupled to the processor, the memory comprising executable instructions that when executed by the processor cause the processor to effectuate operations comprising:
storing a representation of a coupon in the memory of the device;
storing a list of items in the device; and
selecting, based, at least in part, on a match between the stored representation of the coupon and an item of the list of items, the item from the list of items;
determining that the device is within a proximity to the selected item;
altering the display, on the device, of the selected item as proximity of the device to a location of the selected item changes; and
maintaining the altered display of the indication of the selected item on the electronic device as the electronic device moves within a merchant location.

11. The device of claim 10, further comprising:
determining categories for the items included in the list;
determining if the coupon is associated with any of the categories; and
associating the coupon determined to be associated with a category.

12. The device of claim 10, wherein the stored representation of the coupon in the device is wirelessly accessed upon wireless detection of the device proximate a location of a merchant and the stored representation of the coupon in the device is wirelessly accessed.

13. The device of claim 10, the operations further comprising receiving, by the device, information about the selected item.

14. The device of claim 13, the operations further comprising displaying the information on the device prior to products being scanned into the device at a merchant location.

15. The device of claim 10, wherein altering the display comprises:
highlighting the display of the indication of the selected item.

16. The device of claim 10, the operations further comprising:
receiving, by the device, a code identifying a scanned product;
determining whether the coupon is applicable to the code identifying the scanned product;
associating the code identifying the scanned product responsive to determining that the coupon is applicable to the code identifying the scanned product; and
requesting confirmation of the scanned product responsive to determining that coupon is applicable to the code identifying the scanned product and that the coupon is applicable to another product in the same category as the scanned product.

17. The device of claim 16, wherein requesting confirmation of the scanned product comprises:
displaying a message that no coupon is applicable to the scanned product and requesting an indication to one of accept the scanned product or reject the scanned product.

18. The device of claim 16, the operations further comprising:
transferring at least one code identifying the scanned product to a merchant system;
verifying authenticity of the coupon applicable to the code identifying the scanned product;
adjusting a total price to be paid to the merchant based on the at least one code identifying the scanned product; and
invalidating the at least one representation of the coupons applicable to the code identifying the scanned product stored in the device.

19. A computer-readable storage medium that is not a propagating signal, the computer-readable storage medium comprising executable instructions that when executed by a processor cause the processor to effectuate operation comprising:
storing a representation of a coupon in the device;
storing a list of items in the device; and
selecting, based, at least in part, on a match between the stored representation of the coupon and an item of the list of items, the item from the list of items;
determining that the device is within a proximity to the selected item;
altering the display, on the device, of the selected item as proximity of the device to a location of the selected item changes; and
maintaining the altered display of the indication of the selected item on the electronic device as the electronic device moves within a merchant location.

20. The computer-readable storage medium of claim 19, the operations further comprising:
maintaining the display of the selected item on the device as the device moves within a merchant location; and
highlighting the display of the selected item in response to detected proximity of the device to a position within the merchant location that is associated with the selected item.

* * * * *